United States Patent [19]

Franklin et al.

[11] Patent Number: 5,014,543
[45] Date of Patent: May 14, 1991

[54] LEAK DETECTOR

[76] Inventors: Charles C. Franklin, 2827 Crescent Dr., McFarland, Wis. 53558; Edward T. Gisske, 7256 Mineral Point Rd., Verona, Wis. 53593

[21] Appl. No.: 219,204

[22] Filed: Jul. 14, 1988

[51] Int. Cl.$^5$ ............................................. G01M 3/28
[52] U.S. Cl. .................................................. 73/40.5 R
[58] Field of Search .................. 73/40.5 R, 49.1, 49.5, 73/40

[56] References Cited

U.S. PATENT DOCUMENTS

| | | | |
|---|---|---|---|
| 2,979,939 | 4/1961 | Shuh | 73/40 |
| 3,183,723 | 5/1965 | Deters | 73/40.5 R |
| 3,261,201 | 7/1966 | Pottash | 73/40.5 R |
| 3,273,753 | 9/1966 | Johnson et al. | 73/40.5 R X |
| 3,439,837 | 4/1969 | Hearn et al. | 73/40.5 R X |
| 3,454,195 | 7/1969 | Deters | 222/52 |
| 3,541,283 | 11/1970 | Milo | 200/84 C |
| 3,692,050 | 9/1972 | Deters | 137/491 |
| 3,910,102 | 10/1975 | McLean | 73/40.5 R |
| 3,935,567 | 1/1976 | Reynolds | 340/527 |
| 3,940,020 | 2/1976 | McCrory | 220/52 |
| 3,969,923 | 7/1976 | Howell | 73/40.5 R |
| 4,088,987 | 5/1978 | Resler et al. | 73/40.5 R X |
| 4,109,512 | 8/1978 | Ledeen et al. | 73/40.5 R |
| 4,161,957 | 7/1979 | Schoellkopf | 73/40.5 R X |
| 4,404,842 | 9/1983 | Mooney | 73/40.5 R |
| 4,518,955 | 5/1985 | Meyer | 340/605 |
| 4,651,559 | 3/1987 | Horigome | 73/40.5 R |
| 4,679,587 | 7/1987 | Jarr | 73/40.5 R X |

OTHER PUBLICATIONS

"Helium Detector Traces Various UST Line Leaks", *Petroleum Marketer*, Mar./Apr. 1988, pp. 59–61.
Ad–"Red Jacket 'Two-Second' Leak Detector for Remote Submersible Petroleum Pumping System", The Markley Pump Co., Form No. 5170.
Ad–"Red Jacket PLD (The Piston Leak Detector)", Red Jacket Pumps, Form RJ-31.
Ad–"Red Jacket Electronic Probe Monitoring System", Red Jacket, Form RJE-20.
Ad–"Ronan Model TRS-76 Leak Detector System", Ronan Engr., Form X76/787.
Ad–"Precision Products LR 1000 Leak Rater", Universal Sensor and Devices, Inc., USD Bulletin No. LR-8601.

*Primary Examiner*—John Chapman
*Assistant Examiner*—Joseph W. Roskos
*Attorney, Agent, or Firm*—Lathrop & Clark

[57] ABSTRACT

A leak detection system and a method of detecting leaks are disclosed for detecting a leak in a system, including a pump, a dispenser, a conduit communicating the pump and the dispenser, and a valve in the conduit. The valve includes an electronic flow measurement device for detecting leaks in the system downstream of the device.

The system may be operated by a control circuitry, which indicates a predetermined flow of fluid indicating a leak. The present invention is also directed to a method of detecting a leak in a system having a fluid pump, a dispenser, a conduit connecting the pump and the dispenser, a valve in the conduit, and an electronic flow detection system in the valve. The valve is provided with an orifice communicating the conduit with the electronic flow detection system.

The method includes the steps of activating the pump and opening the dispenser to dispense a fluid, and then closing the dispenser while continuing the activation of the pump thereby increasing fluid pressure in the conduit. The increase in fluid pressure causes the valve to close, thus isolating the pump from the dispenser except for the orifice in the valve. The electronic fluid detection system senses the flow of fluid through the orifice.

19 Claims, 4 Drawing Sheets

LEAK DETECTOR

BACKGROUND OF THE INVENTION

1. Field of the Invention

The present invention is directed to an improved leak detection system and method for detecting a leak and specifically to a leak detection system for use with a gasoline fluid dispenser and pump.

2. Description of the Prior Art

Submersible gasoline pumps were first introduced in service stations in the mid-1950s. Following this introduction, it was quickly recognized that by putting gasoline underground, under pressure, environmental harms could result if leaks occurred in the system. Almost as a necessity to sell submerged pumps, line leak detectors were developed. The early models were cumbersome devices which shut off the flow of gasoline if leaks were detected. At that time, there was little concern for the environment, and the cost of the gasoline was considerably less than today. Consequently, if a leak was detected and the flow of gasoline cutoff, the leak detection device was usually blamed and quickly removed as a solution to the problem.

In the early 1960s, more acceptable leak detectors were beginning to be introduced. The early leak detectors took up to 15 seconds to make a line pressure test. No gasoline could be dispensed during that time, which proved to be a problem at busy stations and forced the development of quicker acting devices. Additionally, there was a need for leak detectors which only signaled the leaks and did not stop the serving process. Further, there was an urgent need for leak detectors which were unaffected by pressure changes in the absence of a leak.

The advent of self-service operations forced better technology upon the leak detection systems. These newer leak detector systems operated faster than previous models; however, there was and still is a need for a more precise leak detection system. The problem with prior leak detection systems is not necessarily in the system itself but in its use with certain fluids, especially gasoline. Gasoline, under pressure, in a submerged piping system is influenced by a number of factors, among them, mechanical and hydraulic resilience, thermal contraction and, of course, leaks.

Mechanical resilience is typically caused by the movement under stress of gaskets, check valve seats, diaphragms, etc., due to elasticity. Under normal conditions with all parts of the system working properly, mechanical resilience should not be a major problem.

Hydraulic resilience occurs when fuel is agitated and air becomes entrained in the gasoline. Because air is compressible and gasoline is relatively incompressible, this condition can cause a major problem with leak detection systems which rely on a pressure drop in the system to indicate a leak. The decompression of entrained air reduces the rate at which the pressure will reduce, whatever the cause. Additionally, leak detection systems that utilize a predetermined flow rate will be influenced by the compression of entrained air or vapors within the system.

Thermal contraction is perhaps the least understood of the conditions which can cause a loss of pressure in an underground piping system. Thermal contraction occurs when the temperature of the gasoline in the underground storage tanks is higher than the temperature of the pipelines or dispensers. In the fall and winter, the temperature of the gasoline in an underground storage tank can be considerably higher than the temperature of the surrounding piping, and thermal contraction can occur which will reduce the pressure to zero very quickly.

Examples of prior art leak detectors include U.S. Pat. No. 2,979,939 to Shuh, which is directed to a leak detection system in which the leak detector relies upon a flexible diaphragm. The diaphragm moves in the presence of a leak, activating an alarm switch. This device does not completely shut off the flow of gasoline, but just restricts the flow. U.S. Pat. No. 3,183,723 to Deters discloses an apparatus for detecting leaks in a gasoline delivery system by metering a predetermined flow rate into the system. U.S. Pat. No. 3,261,201 to Potash is directed to a leak detector including a pressure switch with normally open contact switches installed in the dispenser. Upon a decrease in fluid pressure, indicating a leak, a diaphragm in the switch causes the contacts to close, thus activating indicator lights.

U.S. Pat. No. 3,541,283 to Milo is directed to a leak detector which is connected to a pump discharge line. The detector includes a sealed bowl enclosing a vertically movable valve. Also within the bowl is a float, which has an electrical switch attached to it. Under normal conditions, the bowl is filled with liquid, indicating the absence of a leak. When a leak occurs, the liquid level drops, dropping the float which activates an electrical switch. U.S. Pat. No. 3,910,102 to McLean is directed to a portable leak detector designed for aboveground use. This detector measures the hydraulic pressure of the system.

U.S. Pat. Nos. 3,935,567 to Reynolds and 4,109,512 to Ladeen, et al. disclose systems for detecting leaks in a gasoline dispensing operation utilizing an indicator which is designed to measure a predetermined drop in pressure. The drop in pressure activates a control circuit enabling an indicator alarm to turn on.

U.S. Pat. No. 4,518,955 to Meyer and U.S. Pat. No. 4,651,559 to Horigome, et al. utilize control circuitry. Meyer is directed to a leak detector controlled by electronic control devices The detector includes a tube in which a movable piston is placed against a spring. There are two sensors located near the inlet position of the tube. Under normal conditions, the piston is near the inlet end, deactivating the sensors. This indicates an absence of fluid. A pressure drop in the system, indicating a leak, causes the piston to move against the spring which activates the sensors Horigome, et al. are directed to a leak detector, which detects leaks by measuring the difference between the upstream and downstream pressure gradient A change in the pressure gradient indicates the occurrence of a leak. The detection system utilizes a plurality of pressure gauges and computer circuitry to compute the pressure gradient of the gas.

While many of the above-noted patents will operate under certain conditions, they are adversely affected by the changes which occur and which are totally unrelated to leaks in the system. There is therefore a need for an accurate leak detector system which is unaffected by changes in mechanical or hydraulic resilience and thermal contraction situations.

SUMMARY OF THE INVENTION

Accordingly, it is an object of the present invention to provide an improved leak detection system and method for detecting leaks in a fluid dispensing operation.

It is another objection of the invention to provide an improved leak detection system and method in a gasoline dispensing operation.

It is also an object of the present invention to provide a leak detection system which is sensitive enough to measure any significant fluid flow into the piping system downstream of the leak detector.

It is also an object of the present invention to provide a leak detection system which is unaffected by thermal contraction of the gasoline, system resiliency or entrained vapors or air.

The objects of the present invention are provided by a leak detector for use with a fluid pump, a dispenser including a dispenser switch to close off the dispenser and a conduit connecting the fluid pump to the dispenser, wherein a pressurized fluid flows through a flow path in the conduit by means of the fluid pump. The leak detector comprises a valve for isolating the pump from the dispenser. The valve defines an inlet orifice and an outlet orifice on the conduit such that the flow path extends between the inlet orifice and the outlet orifice. The valve also comprises means for closing off all but a portion of the fluid flow between the inlet orifice and the outlet orifice, the portion of fluid flow being used for leak detection purposes. Within the valve, system is an electronic flow measurement device detecting and for measuring the flow of the portion of the fluid. Additionally, the leak detector includes a means responsive to the electronic flow measurement device to indicate a flow rate of the portion of fluid.

The present invention also includes a method of detecting a leak in a system having a fluid pump, a dispenser, a conduit connecting the pump and the dispenser, a valve in the conduit and an electronic flow detection system in the valve, wherein the valve is provided with an orifice communicating the conduit with the electronic flow detection system, comprising activating the pump and opening the dispenser to dispense a fluid, and then closing the dispenser while continuing the activation of the pump thereby increasing fluid pressure in the conduit. The increase in the fluid pressure causes the valve to close thus isolating the pump from the dispenser except for the orifice in the valve. The electronic flow detection system senses the flow of fluid through the orifice.

One particular application for the leak detector system and method of this invention is to detect leaks in a gasoline service station delivery system in which gasoline is intermittently delivered under pressure Gasoline service stations utilize remote pumping systems including a pump and motor unit submerged in an underground tank, which is used to supply gasoline to a plurality of dispensers These systems generally include a dispenser, a conduit connecting the pump and dispenser, and a valve, such as a check valve, in the pump head isolating the pump from the dispenser when the fluid is not being dispensed. The gasoline in the discharge line portion of the conduit between the valve and the dispenser is under pressure during dispensing and between dispensing operations. When remote pumping systems are used for the dispensing of gasoline, it is important to determine whether or not there is a leak in the conduit. Prolonged undetected leakage may of course result in a dangerous accumulation of gasoline in the ground.

The leak detector system of the present invention instantly senses downstream leakage by the highly sensitive electronic flow detector incorporated into the system. This avoids false readings which may occur upstream of the leak detector at the submerged pump line check valve or thermal expansion relief valve.

The system of the present invention is also advantageous in that it not only measures the rate at which any fluid is flowing into the piping system but also any changes in the rate of flow. By keeping the system under pump operating pressure all the time that a test is being performed, thermal contraction effects on fluid flow will be minimized. However, there may still be the possibility that contraction of the product is possible. By measuring not only the rate of fluid flow, but the change, if any, in the flow rate, the fluid flow allowed by thermal contraction and the flow caused by a leak can be differentiated. Thermal contraction causes the fluid to flow at a varying rate because the temperature differential between the fluid and the surrounding piping will continuously be reducing as the piping absorbs heat from the fluid. On the other hand, the fluid flow caused by a leak will be constant for all practical purposes.

The leak detector of the present invention provides a very sensitive flow meter to measure any flow into the piping system downstream of the leak detector. Leaks in the magnitude of 0.05 gallons per hour are easily detected utilizing the leak detector of the present invention. Further, by the incorporation of the electronic flow measurement device, specifically the rotometer, fluid temperature is virtually eliminated as a consideration in the leak detection process.

DETAILED DESCRIPTION OF THE INVENTION

The present invention is directed to a leak detection device for use in a fluid operation. The leak detection device uses a very sensitive flow meter to determine any flow into the piping system downstream of the leak detector Leaks of greater than 0.05 gallons per hour may be easily detected by the use of the leak detector of the present invention. Reference will now be made to the figures in which like numerals will represent the same features of the invention throughout.

Figure 1:
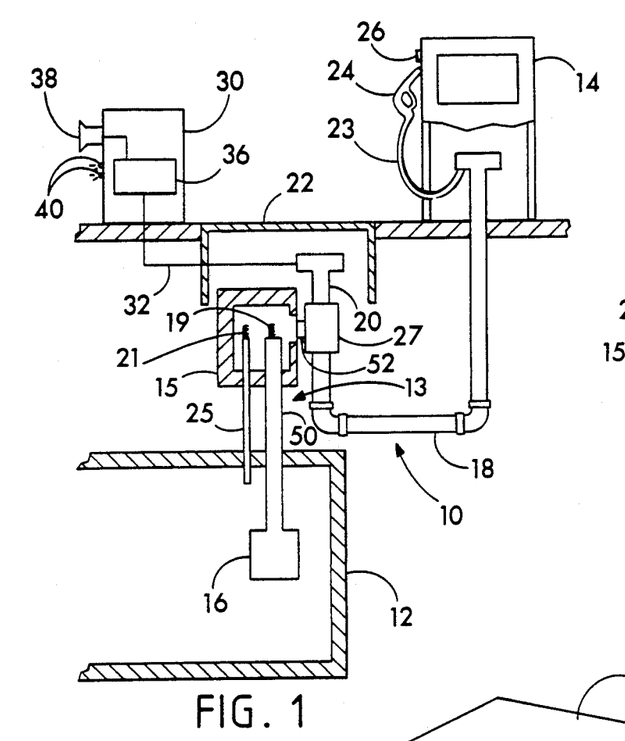
FIG. 1 is a diagrammatic view of a service station gasoline pipeline installation having a leak detecting apparatus of the present invention applied thereto.
Figure 1A:
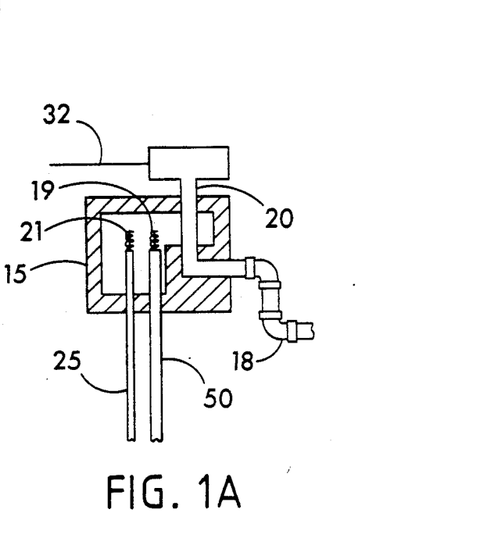
FIG. 1A is a diagrammatic view of an alternative embodiment of a portion of the service station gasoline pipeline installation of FIG. 1 having the leak detecting apparatus of the present invention applied to the submersible pump.

While there are many possible different applications available for the present invention, reference is made to FIGS. 1 and 1A for a preferred application of the present invention, which will serve as a representative example. FIG. 1 illustrates a dispensing system 10 of the type used in gasoline service stations. The dispensing system 10 generally includes an underground storage tank 12, which supplies gasoline to any of a number of dispensers 14, of which one is shown. A submersible pump system 13 pumps gasoline from the tank 12 through underground delivery lines or conduits 18 to the dispenser 14. The conduit 18 includes a hydraulically operated valve system 20.

Referring now specifically to FIG. 1, the submersible pump system 13 consists of a pump head 15 and a pump motor 16 which are connected by a conduit 50. The submersible pump head 15 contains a line check valve 19 which prevents fluid in the conduit 18 from flowing back into the underground storage tank 12, and a thermal expansion relief valve 21 to direct excess fluid back through an expansion conduit 25 to the storage tank 12.

The valve system 20 and the control box 30, illustrated in FIGS. 2-6, form the basis of this invention. The valve system 20 is mounted in a suitable external housing 27 connected to the pump head is by a conduit 52. Alternatively, as illustrated in FIG. 1A, the valve system 20 may be contained within the submersible pump head 15. The valve system 20 and the submersible pump 13 are generally provided with a porthole or manhole cover 22 for easy accessibility.

The dispensers 14 are provided with a delivery hose 23, connected to the conduit 18 in a conventional manner, and a manually operable dispenser nozzle valve 24. A pump control switch 26 is normally located on the dispenser 14 and is manually operated to start the pump just before the gasoline is to be dispensed. The dispenser 14, the storage tank 12 and the submersible pump 13 are conventional and well known and do not form a novel part of the invention.

Figure 2:
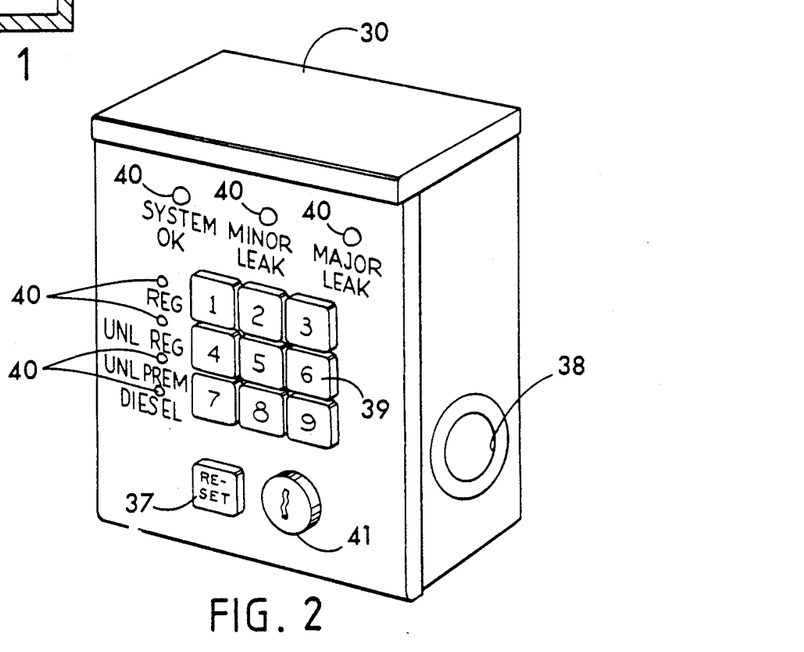
FIG. 2 is an isometric view of a control box which may be used with the leak detector of the present invention.

Referring now to FIGS. 1 and 2, the dispensing system 10 of the present invention also includes a control box 30 connected to the valve system 20. The control box 30 houses the electrical control circuitry. The control box 30 is designed for use in gasoline service stations which use submerged pumps, such as the pump system 13. A typical situation will have four valve systems 20, one for each submersible pump system 13, and one control box 30. The control box 30 will have four channels, each including a connecting wire or wires 32 or other means for integrating the circuitry between the valve system 20 and the control box 30. There will be one channel for each valve system 20. The control box 30 is generally located in a secure area, such as the service station office, where it can be readily observed. The control box 30 includes a microprocessor 36 which, when activated by the leak detector 28 within the valve system 20, activates a signaling means such as a horn 38 or lights 40. The microprocessor 36 has the ability to differentiate between constant flow, which would occur if there was a leak, and variable flow, which would occur under non-leak conditions, such as a system resiliency or contraction or a combination of the two. In this manner, a leak in the system will be detected by the leak detector 28 which passes the information electrically to the control box 30. The control box 30 thereupon activates a signal by means of the horn 38 and/or the lights 40.

As illustrated in FIG. 2, the control box 30 would determine and notify the operator by a lighting system of the location of the leak, i.e., the regular (REG) gasoline storage tank, the unleaded regular (UNLREG) storage tank, the unleaded premium (UNLPREM) storage tank or the diesel (DIESEL) storage tank, and the extent of the leak, i.e., no leak or leak of less than 0.05 gallons per hour (SYSTEM OK), a leak in the range of 0.05-0.5 gallons per hour (MINOR LEAK), or a leak having a flow greater than 0.5 gallons per hour (MAJOR LEAK). The control box 30 may be reset digitally by numbered buttons, such as at 39, or by inserting and turning a key in keyhole 41 and pressing reset button 37. The control box 30 also would include a system having the ability to measure and quantify the magnitude of the leak and to store the data indefinitely.

Figure 3:
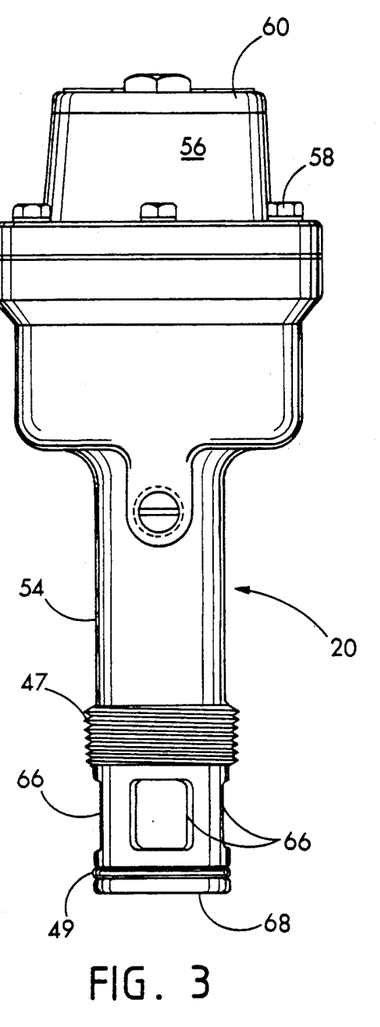
FIG. 3 is an elevated side view of the leak detector of the present invention.
Figure 4:
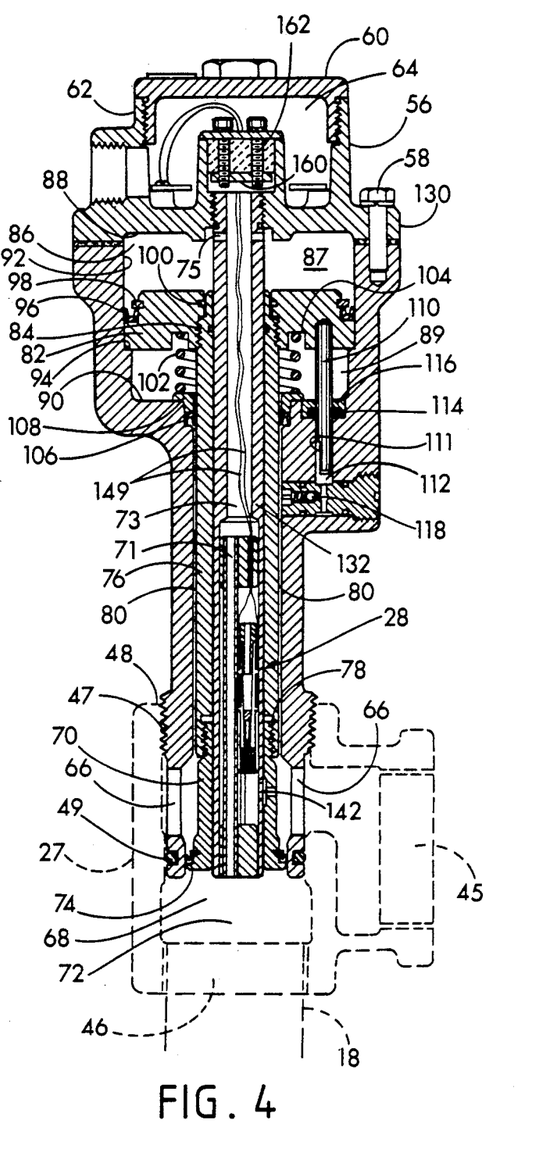
FIG. 4 is a detailed cross-sectional view of the leak detector of the present invention.

Referring now to FIGS. 3 and 4, there is illustrated the hydraulic valve system 20 with the leak detector 28 for use in the dispensing system 10. The valve system 20 is located in the conduit 18 between the pump system 13 and the dispenser 14. The purpose of the valve system is to isolate the pump system 13 from the dispenser 14 when fluid is not being dispensed.

The valve system 20 includes a substantially vertical housing 54, made of cast iron, aluminum, plastic or other materials known to the art. The housing 54 surrounds and places the leak detector 28 in proper alignment with the conduit 18. A removable cap 56, made of the same or different material as the housing 54, is attached to the housing 54 by attachment bolts 58 or other means known to the art. The cap 56 may be removed for placement, repair or repositioning of the leak detector system 28. A removable top 60 is threadibly inserted into cap 56 at positions 62. The top 60 allows easy access into a leak detector control circuitry chamber 64.

The valve system 20 defines inlet orifice 66 which connects the fluid path of the submersible pump system 13 from the pump 16, the conduit 50 and the pump head 15, and through the outlet orifice 68. Thus, when the system is dispensing the gasoline fluid, the fluid will enter the inlet orifices 66 from the conduits 50 and 52 and flow through the outlet orifice 68 to the conduit 18, which communicates the fluid with the dispenser 14. As illustrated in FIG. 3, there may be a plurality of inlet orifices 66 to compensate for the position of the valve system 20 in the housing 15. Therefore, the valve system 20 does not have to be positioned precisely with respect to the housing 27 or to the pump head 15.

The conduit 18 is generally connected to the submersible pump head 15, as illustrated in FIG. 1A, or provided with a conduit adapter illustrated in phantom in FIG. 4 at 27, and designed to receive the valve system 20. The adapter 27 is preferably L-shaped such that the horizontal arm 45 communicates with one of the inlet orifices 66 and the vertical arm 46 communicates with the outlet orifice 68 of the substantially vertical valve system 20. Preferably the valve system 20 is provided with threads 47 to be threadably received through adapter opening 48 in such a manner that inlet orifice 66 is in direct communication with horizontal arm 45. The portion of the housing 54 below the inlet orifices 66 is provided with an exteriorly mounted sealing "O" ring 49 to provide a sealing connection between the valve system 20 and the adapter 44.

Referring now specifically to FIG. 4, the valve system 20 includes a poppet 70 which may be slidably moved in the fluid flow path 72 in order to prevent fluid from passing through the valve system 20. The poppet 70 includes a poppet seal 74 to prevent any fluid leakage between the poppet 70 and the housing 54. The poppet 70 is attached to an outer tube 76 by threads 78 or other means known to the art. The outer tube 76 is slidably arranged within a chamber 80 of the housing 54.

At the end of the outer tube 76, opposite the poppet 70, the outer tube 76 is secured to a piston 82 by threads 84 or other means known to the art. The piston 82 is slidably arranged in a piston chamber 86 of the housing 54. The piston chamber 86 includes an upper wall 88, a lower wall 90, and a side wall 92. The side wall 92 is provided with a protruding shelf 94 upon which the piston 82 rests when it is in the lower position. The shelf 94 divides the piston chamber 86 into an upper portion 87 and a lower portion 89. The piston 82 is also provided with a piston seal 96 attached to the piston 82 by the piston seal retaining ring 98. Additionally, a piston "O" ring 100 is in placement between the piston and the outer chamber 76 in order to prevent any leakage therethrough.

Situated between the piston 82 and the lower wall 90 of the piston chamber 86 is a piston spring 102 for providing tensile pressure against the piston 82. Preferably, the piston 82 is provided with a channel 104 to assist in the placement of the piston spring 102.

An outer tube seal 106 and outer tube seal backing 108 are provided between the housing 54 and the outer tube 76 in order to prevent any leakage therethrough.

The valve system 20 is also provided with a connection conduit 71 which communicates fluid from the fluid flow path 72 to an interior chamber 73, which in turn communicates fluid to the upper portion 87 of the piston chamber 86 via a conduit 75.

Figure 5:
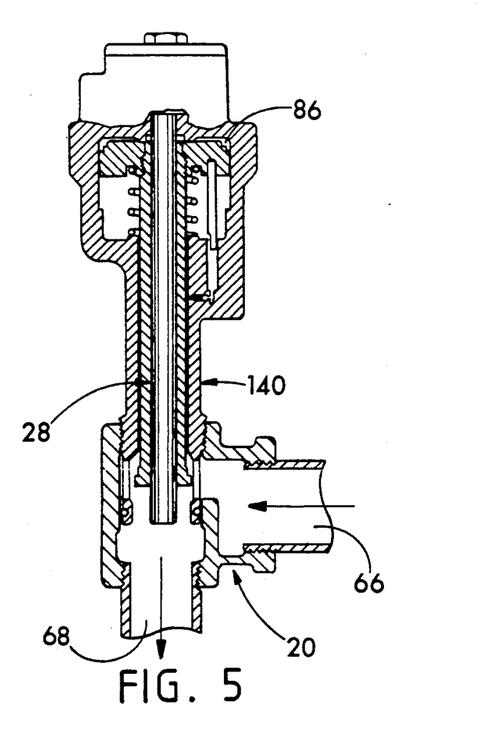
FIG. 5 is a cross-sectional view of the leak detector of FIG. 4 showing the valve in open position.
Figure 6:
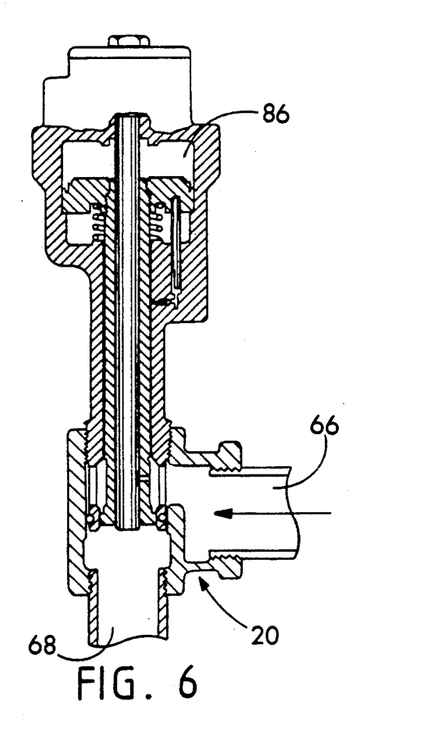
FIG. 6 is a cross-sectional view of the leak detector of FIG. 4 showing the valve in closed position.

Under normal conditions, when fluid is flowing through the dispensing system 10, fluid fills the connection conduit 71, the interior chamber 73 and the upper portion 87 of the piston chamber 86. When fluid is being dispensed from the dispenser 14, the fluid pressure in the system 10 is lower than the shut pressure and the poppet is in the raised position as illustrated in FIG. 5. When the fluid dispensing is stopped and the dispenser switch 26 is shut off, pressure builds in the system, the pressure buildup being due to the continued activation of the pump 16 which has not been shut down. The pressure increase becomes readily apparent in the upper portion 87 of the piston chamber 86, and forces the piston 82 downwardly to the shelf 94, as illustrated in FIGS. 4 and 6. The poppet 70 is therefore forced downwardly to effectively seal off the conduit 18 at adapter 27 or submersible pump head 15.

Once the dispenser 14 is reactivated and the dispenser nozzle 24 opened, the fluid pressure is substantially reduced which allows the piston 82 and the poppet 70 to rise thus allowing uninterrupted fluid flow through the conduit 18.

The valve system 20 is further provided with a fluid release plunger 110 connected to the underside of the piston 82. The release plunger 110 is movably placed within a chamber 112. A plunger seal 114, held to the housing 54 by means of a retainer 116, provides a slidable seal between the release plunger 110 and the chamber 112 in order to eliminate any unwanted fluid seepage. The release plunger 110 is a cylindrical piece with a cutaway portion 111 provided thereon. When the piston 82 is in its upmost position, the cutaway portion 111 is positioned so as to provide fluid communication of the lower portion 89 of the chamber 86 with the chamber 112. In this manner, any fluid which may have been trapped in the lower portion 89 of the chamber 86 will flow into chamber 112 via portion 111. A positive displacement check valve 118 is provided in connection with the fluid release valve 110 and chamber 112 to displace any fluid seepage which may occur. The check valve 118 is designed to urge the fluid into chamber 80 which communicates with the conduit 18. Alternatively, the check valve 118 may be designed to urge the fluid outside the housing and to the storage tank 12 via a communicating line (not illustrated).

The leak detector 28 is fixedly positioned within the housing 54 by threaded mountings 130 or other means known to the art. The leak detector 28 is surrounded by an inner tube 132, around which the outer tube 76 is slidably placed. The inner tube 132 includes an interior chamber 73, which is in communication with the connection conduit 71. The leak detector 28, which forms the basis of the present invention, is located substantially beside the connection conduit 71 and below the interior chamber 73.

Figure 4A:
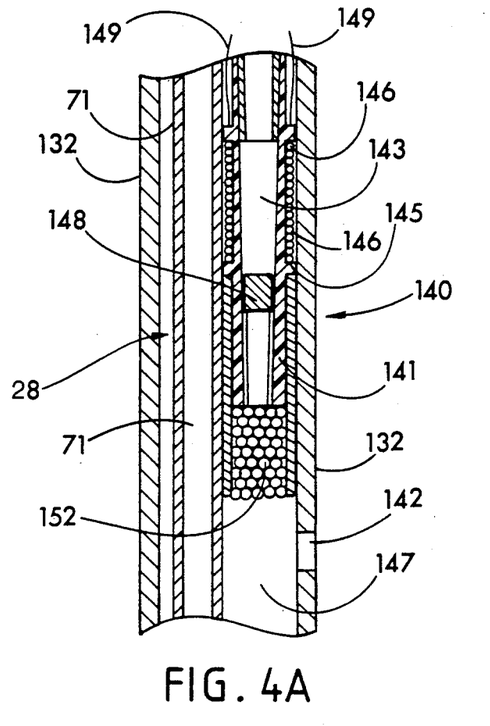
FIG. 4A is a cross sectional view of the electronic flow measurement device of the present invention, with the rotometer shown in detail.

Referring now to FIG. 4A, which is an enlargement of a portion of the leak detector 28 illustrated in FIG. 4, the electronic flow measurement device, which is located in the leak detector main body and is plumbed so that any flow must go through the sensor, includes a rotometer 140 which measures the fluid flow into an orifice 142. The rotometer includes a tapered, bored cylinder 141 comprised of plastic, glass or other non-conductive materials having an internal rotometer chamber 143. Preferred materials for use with gasoline include Celcon ® and Delrin ®. Rotometer chamber 143 communicates with a flow chamber 147 to allow fluid to flow through orifice 142 to chamber 147 and then to rotometer chamber 143. Alternatively a filter 152 may be placed between the chambers to filter out impurities.

Figure 7:
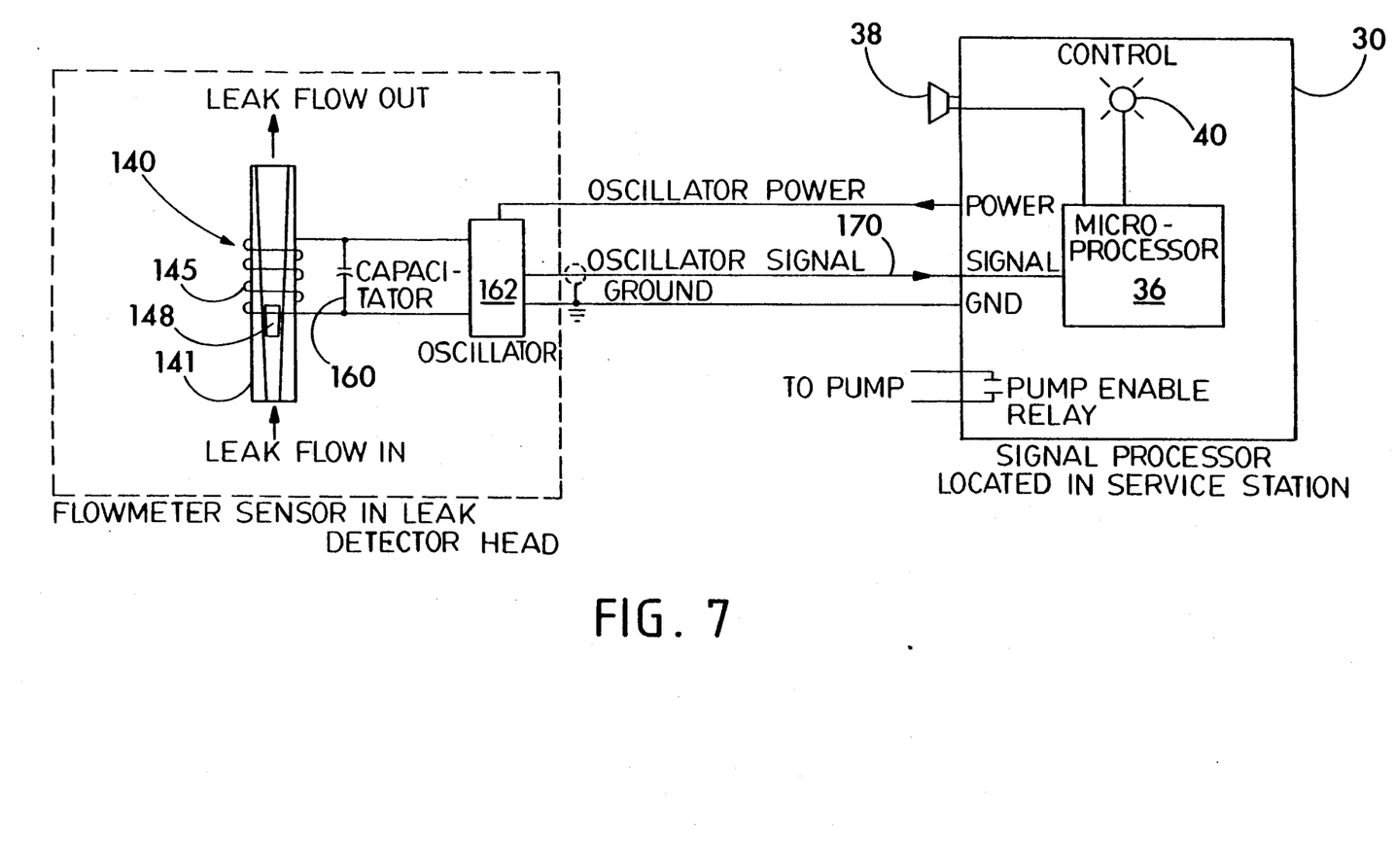
FIG. 7 is a schematic circuit diagram of a control circuit for use with the present invention.

Located within the tube 141 is a flow meter float 148, made of an electrically conductive material. A preferred composition for the float is brass. The tube 141 has a coil 146 of electrically conductive wire, preferably copper, wrapped around it to approximately 150 turns and located so the float 148 is just beyond the lower boundary 145 of the coil 146 when there is no flow and substantially surrounded by the coil 146 at full flow. The coil 146 is connected, by wires 149, in parallel with a capacitor 160, illustrated in FIGS. 4 and 7, to form a parallel resonant tank circuit that controls the frequency of an L-C oscillator 162. The oscillator 162 is located in the control circuitry chamber 64.

The operation of the leak detector system will now be described. In operation, when the pump 16 is activated by the closure of the pump control switch 26 and the dispenser nozzle valve 24 is opened in order to dispense a fluid, such as gasoline, the pressure differential across the valve system effects the opening of the valve 20 to permit the gasoline to flow through the conduit 18. The poppet 70 is thereby raised in order to allow steady fluid flow through the valve system 20.

Upon closure of the dispensing nozzle valve 24, the valve system 20 closes as described previously. When all dispenser switches 26 are turned off, a holding circuit will take over control of the pump 16 until the line test is completed. It is to be noted that the leak detector 28 will test the piping for leakage each time the pump is turned on, but after dispensing of the gasoline is stopped. The increase in pressure in the conduit 18 to the dispensers 14, as a result of the flow from the pump being shut down, will cause the piston 82 to move the poppet 70 downwardly thereby closing off the discharge port of the pump except for the small orifice 142 through which any fluid flow must pass.

The leak detector system 28 is located in this flow path and measures the rate of product flow into the conduit 18. This is accomplished by the rotometer 140 which is located in series with the orifice 142. The rotometer coil 146 is wrapped around the cylinder 141 and connected in parallel with the capacitor 160. As flow increases, indicating a leak, the float 148 rises in the cylinder 141 and into the area surrounded by the coil 146. As the float 148 moves through the coil 146, the float reduces the coil inductance, which in turn changes the oscillation frequency of the system in a known and repeatable fashion. The oscillator 162 produces a roughly 1 volt peak-to-peak signal at a frequency of about 600 kilohertz (KH). This change in frequency is supplied to the signal processing electronics, via line 170, to the control box 30, and this data is fed into the microprocessor 36. The microprocessor 36 will be programmed to display data by means of the horn 38 or lighting system 40.

The purpose of the control box is to interpret the oscillator signal 170, convert the frequency to flow rate, and control the shutdown of the fuel pump 16 if a leak occurs. Temperature compensation of the leak detector 28 is accomplished by measuring the oscillator frequency during a known no-flow period and establishing this frequency as the zero flow reference. The frequency measured during the leak test is then referred to this reference frequency to get a difference frequency. This difference frequency is then used to compute the leak flow rate. The auto-zero temperature compensation routine is performed during every dispensing cycle and effectively cancels out the effects of long-term frequency drift due to component aging, fuel temperature changes, etc. An example of a difference frequency is about 75 Kilohertz for a 0.4 gallon per hour leak rate.

If there is a leak downstream of the leak detector 28, at constant pressure, the flow through the leak detector 28 will be constant. However, if there is air trapped in the line or entrained in the gasoline or if thermal contraction is taking place, there still could be some fluid flow, although not indicative of leakage. Flow that occurs as a result of system resilience or thermal contraction will not be at a constant rate, but instead at a diminishing rate. The microprocessor 36 will be able to differentiate between a constant and a varying rate or any combination of the two.

The control circuitry in the control box 30 will have a memory capability and have date and time functions to record data. The output circuit from the leak detector 28 will quantify the flow within the range of 0.05 to 0.5 gallons per hour. As indicated above, the control box 30 will contain lights which indicate the condition, such as green lights for a no flow (or less than 0.05 gallons per hour), yellow lights for flow rates between 0.05 and 0.5 gallons per hour, and red lights for any higher flow rate. In addition to the above, there will be an audible alarm, such as the horn 38, which will sound every time there is a leak indication. The audible alarm can be deactivated, such as by typing in the proper code on keys 37 provided on the control box 30 or by a reset button 39.

There will also be the capability to program a leak rate into the controller, which when exceeded will interrupt the circuit to the pump control relay and shut down the pump 16. This control can only be overridden by typing a preauthorized code or by activating a key lock on the cover of the control box 30. The control box 30 could also incorporate a test circuit for each channel. Software can be provided which will identify the date and time any malfunction indication occurs, the code identification of anyone resetting the system, the estimated total leakage that occurred between the time of the original indication and when the system was reset. Preferably, there will be a battery in the circuit to preserve the stored data in the event of a power failure and a means of keeping the battery charged or recharged.

By keeping the system under pressure all the time that a test is being performed, thermal contraction effects on fluid flow will be minimized. However, there is still the possibility that contraction of the product is possible. By measuring not only the rate of fluid flow but the change, if any, in the flow rate, the electronic circuitry can differentiate between flow allowed by thermal contraction and by leaks. The flow by the thermal contraction flows at a varying rate, while the flow as a result of a leak will be constant for all practical purposes.

The device of the present invention will instantly sense downstream leakage by the movement of the float in the flow meter. The leak detector system will not only measure the rate at which any fluid is flowing into the piping system, but also any changes in the rate of flow. The system will effectively eliminate leaks that can contaminate the environment.

It is understood that the invention is not confined to the particular construction and arrangement herein illustrated and described but embraces such modified forms thereof as come within the scope of the following claims.

What is claimed is:

1. A leak detector for use with a fluid pump, a fluid dispenser including means to close off the dispenser, and a conduit connecting the fluid pump to the dispenser, wherein a pressurized fluid flows through a flow path in the conduit by means of the fluid pump, the leak detector comprising:
   (a) a valve for isolating the pump from the dispenser, wherein the valve defines an inlet orifice and an outlet orifice in the conduit such that the flow path extends between the inlet orifice and the outlet orifice, the valve comprising means for closing off all but a portion of the fluid flow between the inlet orifice and the outlet orifice, the portion of fluid flow being used for leak detection purposes;
   (b) an electronic flow measurement device for measuring the flow of the portion of the fluid; and
   (c) means responsive to the electronic flow measurement device to electrically indicate a flow rate of the portion of the fluid.

2. The leak detector of claim 1 comprising a movable piston adapted to lower a poppet into the flow path to effectively stop the flow of fluid through the conduit, wherein the poppet comprises an opening through which the portion of the fluid flows.

3. The leak detector of claim 2 wherein the valve is a hydraulically operated valve.

4. The leak detector of claim 3 wherein the piston is hydraulically operated in response to an increase in fluid pressure in the conduit.

5. The leak detector of claim 1 wherein the electronic flow measurement device includes a rotometer which measures the portion of flow of fluid.

6. The leak detector of claim 5 wherein the rotometer comprises a rotometer cylinder around which is placed an inductance coil, a flow meter float adapted to change the inductance of the coil, the change generating a signal responsive to the predetermined flow of the portion of the fluid.

7. The leak detector of claim 6, wherein the inductance coil is made of copper.

8. The leak detector of claim 1 wherein the means responsive to the electronic flow measurement device includes a microprocessor programmed to display data as required.

9. The leak detector of claim 8 wherein the microprocessor includes a program to display only data relating to the constant flow of the portion of fluid flowing through the opening.

10. The leak detector of claim 1 further comprising a holding circuit to keep the pump running after the dispenser is closed off.

11. The leak detector of claim 1 further comprising means to determine changes in the rate of flow of the fluid.

12. The leak detector of claim 1 comprising an electronic flow measurement device which can detect fluid leaks in the magnitude of 0.05 gallons per hour.

13. The leak detector of claim 1 wherein the means responsive to the electronic flow measurement device includes a microprocessor, which is activated by the electronic flow measurement device to generate a leak detection signaling means.

14. The leak detector of claim 13, wherein the microprocessor includes a program to differentiate between constant flow, indicating a leak, and variable flow of the fluid.

15. A method of detecting a leak in a system having a fluid pump, a dispenser, a conduit connecting the pump and dispenser, a valve in the conduit and an electronic flow detection system wherein the valve is provided with an orifice communicating the conduit with the electronic fluid detection system, comprising:
   (a) activating the pump and opening the dispenser to dispense a fluid;
   (b) closing the dispenser while continuing the activation of the pump thereby increasing the fluid pressure in the conduit, the increase in the fluid pressure causing the valve to close thereby isolating fluid flow from the pump to the dispenser except for the fluid flow through the orifice in the valve; and
   (c) sensing by electrical means the flow of fluid through the orifice by the electronic flow detection system.

16. The method of claim 15, wherein the electronic flow measuring system includes a rotometer located in series with the orifice, the rotometer including a rotometer coil enclosing a rotometer cylinder, the tube defining a float chamber, and a float, wherein the flow of fluid causes the float to rise in the float chamber to an area surrounded by the coil, thereby changing the oscillation frequency of the system.

17. The method of claim 16 wherein the microprocessor includes a program to differentiate between a constant flow of fluid and a varying rate of fluid.

18. The method of claim 15 further comprising measuring the oscillation frequency by an appropriate electronic circuit, the measuring causing the generation of data which is fed to a microprocessor, wherein the microprocessor is programmed to display the data by a signaling means.

19. The method of claim 15 further comprising sensing the flow of at least 0.05 gallons of fluid per hour through the orifice by the electronic flow detection system.

* * * * *

UNITED STATES PATENT AND TRADEMARK OFFICE
CERTIFICATE OF CORRECTION

PATENT NO. : 5,014,543
DATED : May 14, 1991
INVENTOR(S) : FRANKLIN et al

It is certified that error appears in the above-identified patent and that said Letters Patent is hereby corrected as shown below:

Title Page , add -- Asignee: F. E. Petro, Inc., Bluffton, Indiana --.

Col. 1, line 34, "pressure changes" should be -- pressure and temperature changes --.

Col. 2, line 49, insert a period after "sensors".

Col. 3, line 29, "detecting and for measuring" should be -- for detecting and measuring --.

Col. 3, line 52, insert a period after "pressure".

Col. 3, line 56, insert a period after "dispensers".

Col. 4, line 67, insert a period after "detector".

Col. 5, line 28, "head is by" should be -- head 15 by --.

Signed and Sealed this

Thirty-first Day of May, 1994

Attest:

BRUCE LEHMAN

Attesting Officer

Commissioner of Patents and Trademarks